No. 846,684. PATENTED MAR. 12, 1907.
J. H. MOORE.
CIGAR LIGHTER.
APPLICATION FILED OCT. 2, 1906.
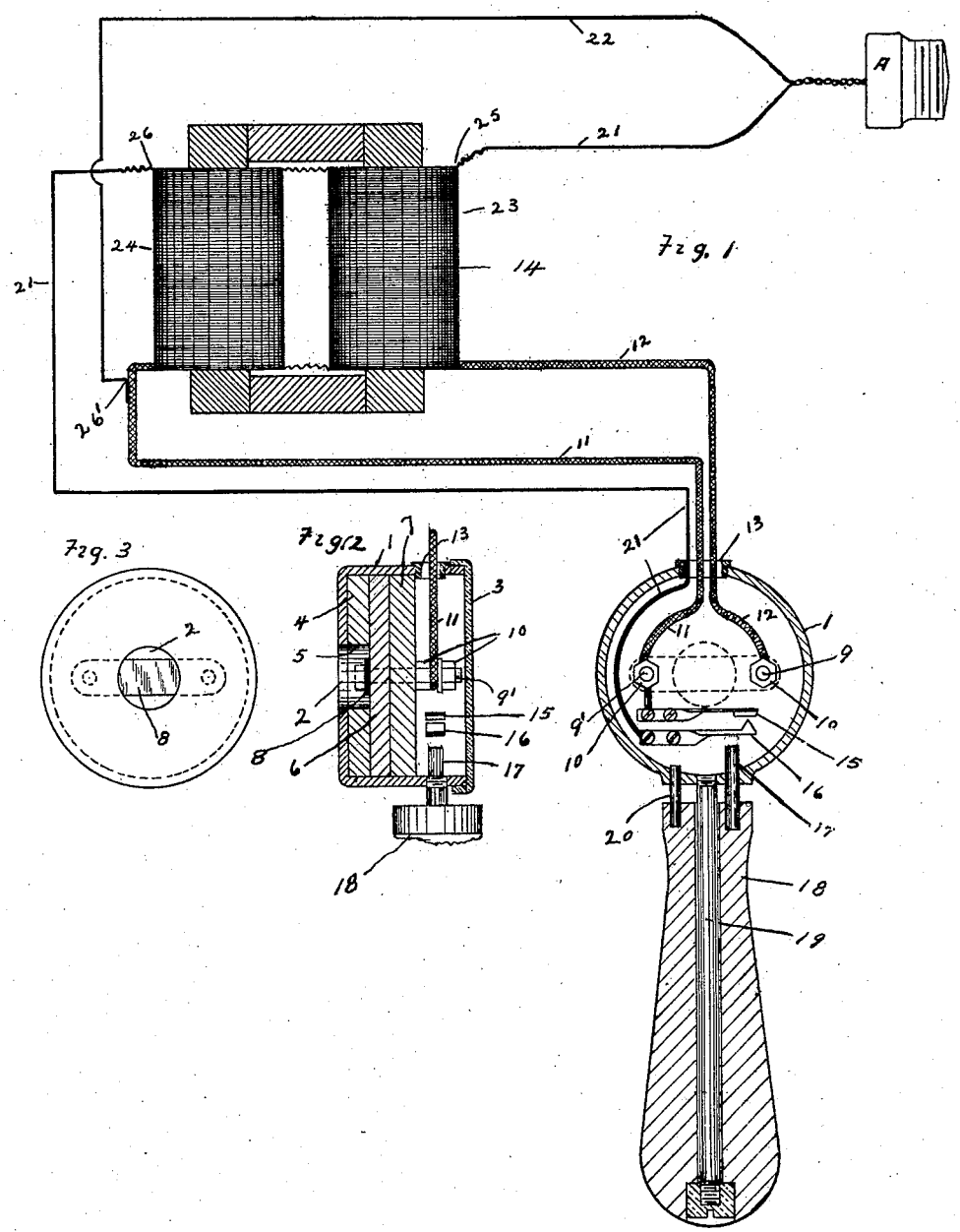
WITNESSES:
INVENTOR.
BY
ATTORNEY.

UNITED STATES PATENT OFFICE.

JAMES H. MOORE, OF PORTLAND, OREGON, ASSIGNOR TO MOORE ELECTRIC CIGAR LIGHTER COMPANY, OF PORTLAND, OREGON, A CORPORATION OF OREGON.

CIGAR-LIGHTER.

No. 846,684.      Specification of Letters Patent.      Patented March 12, 1907.

Application filed October 2, 1906. Serial No. 337,079.

*To all whom it may concern:*

Be it known that I, JAMES H. MOORE, a citizen of the United States, residing at Portland, in the county of Multnomah and State of Oregon, have invented a new and useful Cigar-Lighter, of which the following is a specification.

My invention relates to improvements in cigar-lighters, and particularly to electrical cigar-lighters, having among its salient objects to provide a cigar-lighter which can be readily connected with and take its electrical energy from the ordinary electric-lamp circuit where alternating current is used, the current being conducted into the primaries of a step-down transformer, and the secondaries of which produce a low-potential current of sufficient volume to heat a resistance-piece to the required degree for lighting purposes in a moment's time; to provide a cigar-lighter of the character referred to which requires no batteries for its operation, thus avoiding the expense of frequent repairs and the inconvenience of failures to operate; to provide a lighter of the character referred to which is convenient of operation and in which the circuit is automatically completed and the current used only during the time the lighter is actually in use, thus providing a device which uses a very small amount of electrical energy, and, in general, to provide an electric cigar-lighter which will be practicable, inexpensive in operation, and neat and attractive in appearance.

I am aware that electrical cigar-lighters have been made where the full current is used, whether it be direct or alternating current; but my device requires much less current and is therefore more desirable and less liable to get out of repair and has been found by actual experimenting to be a very practicable and economical device.

My invention will be readily understood from the following specification, reference being had to the accompanying sheet of drawings, in which—

Figure 1 is an elevation, partly in section, of one embodiment of the invention. Fig. 2 is a sectional view through the lighter proper, the handle being broken away; and Fig. 3 is a front or face view of Fig. 2.

In the drawings, 1 designates the casing, of cup-like construction, with an opening 2 in the front thereof and a cap or cover 3 for the rear. 4 designates an insulating-washer provided with a central opening 5, 6 a disk of asbestos or other protective material, and 7 a disk of insulating material, which insulating material may be of suitable fiber or other preparation not easily burned.

Across the openings 2 5 within the casing and against the asbestos disk is a piece of thin resistance material 8, being platinum in the present instance and of such proportions as to be heated by the passing therethrough of the low-potential current. This resistance-piece 8 is held in place by means of two small bolts 9 9', which pass through the asbestos and insulating disks and are provided with nuts 10 10 in the rear of the casing 1, said nuts also forming binding-posts or connections for the circuit-wires 11 12, leading into the casing through an opening 13 from a transformer 14. The wires 11 and 12, with the resistance-piece 8, form a circuit for the low-potential current generated by the passing of the main circuit through the coils of the transformer 14, said low-potential or secondary circuit being hereinafter again referred to.

15 and 16 designate two contact springs or clips adapted to be moved together by a pin 17, preferably of insulating material, mounted in the handpiece 18 and working loosely through the casing 1. The handpiece 18 is adapted to slide upon a center pin 19 in such a manner that when the handpiece is grasped in the hand the casing 1 and the center pin 19 attached thereto by their own weight move downwardly through the handpiece, thus operating to cause the contact-spring 16 to be moved upwardly by the pin 17 until it engages the other contact-spring 15. A guide-pin 20 is provided in the opposite side of the handpiece for the purpose of preventing any turning or twisting movement of the casing upon the handpiece. The handpiece 18 is made of some insulating material, such as wood, hard rubber, or other suitable material.

Referring again to the transformer, (designated as a whole 14,) this is of the ordinary and well-known construction, and its construction forms no part of the present invention. 21 22 designate the wires of the ordinary electric-lamp circuit and of the usual one hundred and ten voltage of alternating current, the wire 21 entering the coils at 25 and emerging therefrom at 26.

Describing the main or primary circuit, it may be traced along the main conductor 21, through coil 23, through coil 24, through the opening 13 in the casing 1, through contact-spring 16, contact-spring 15, back over the conductor 11 of the secondary or low-potential circuit, which is here used as a common return-conductor, to the point 26', thence out over the main conductor 22 to the source or attachment-plug A.

The secondary or low-potential circuit may be traced from the coil 23, along conductor 12 into the casing 1 to its connection with the binding-post 9, through the resistance-piece 8, the binding-post 9', along the conductor 11 to the opposite coil 24 of the transformer, thus, with its passage around the coils, completing the secondary circuit. It is understood, of course, that the low-potential current passing through this secondary circuit is by induction and is of very low voltage, being not more than three or four volts, or of just sufficient force to carry the required flow of current to heat the resistance-piece 8.

The operation of the device will be readily understood from the foregoing description, but may be briefly stated as follows: When the handpiece is grasped, the weight of the casing operates automatically to complete the primary circuit, this being caused by the downward movement of the casing through the handpiece, which moves the contact-springs 15 and 16 together. Almost immediately the resistance-piece 8 is heated to the required degree to ignite anything which may be thrust against it. Therefore the handpiece is simply grasped by the smoker and raised to his cigar, the end of which is thrust through the opening 2 against the heated resistance-piece 8, and it is readily ignited. As soon as the handpiece is released the circuit is broken and the resistance-piece cooled. It may be pointed out that the operation is so quickly done that a full flow of current is hardly reached before it is broken, thus making the device a very economical one from the amount of current used. The resistance-piece is preferably made of platinum, for the reason that it can be reduced to the right proportions to be heated by the induced current and can be repeatedly heated with very little or any damage thereto.

While I have herein shown and described but one form or embodiment of the invention, it will be obvious that alterations and modifications can be made without departing from the spirit of the invention, and I do not, therefore, limit the invention to the particular form herein described.

I claim—

1. A cigar-lighter comprising in combination with an electric circuit, a casing, a resistance-piece mounted within said casing and connected in said circuit, circuit making and breaking mechanism within said casing, and a handpiece for supporting said casing and having a movement relative thereto adapted to manipulate said circuit making and breaking mechanism.

2. A cigar-lighter comprising in combination with an induced or low-potential current of electricity, a casing, a resistance-piece mounted in said casing and connected in the circuit for said current, circuit making and breaking mechanism within said casing, and a handpiece slidably connected with said casing and adapted to automatically make and break the circuit when grasped and released, substantially as described.

3. A cigar-lighter comprising in combination with a source of alternating current of electricity, a transformer connected therewith, a secondary or low-potential circuit emerging from said transformer, a casing through which said circuits pass, a resistance-piece within said casing and connected in the secondary circuit, and means for making and breaking the circuits.

4. In a cigar-lighter of the character referred to, the combination with a main or primary circuit of electricity, of a transformer, a secondary circuit from said transformer, a hand-casing through which both the primary and secondary circuits pass, a resistance-piece mounted within said casing and included in the secondary circuit, circuit making and breaking mechanism included in the primary circuit and within said casing, a handpiece, and means for manipulating said circuit making and breaking mechanism, substantially as described.

JAMES H. MOORE.

In presence of—
 J. A. BECKWITH,
 W. R. LITZENBERG.